Patented Nov. 15, 1949

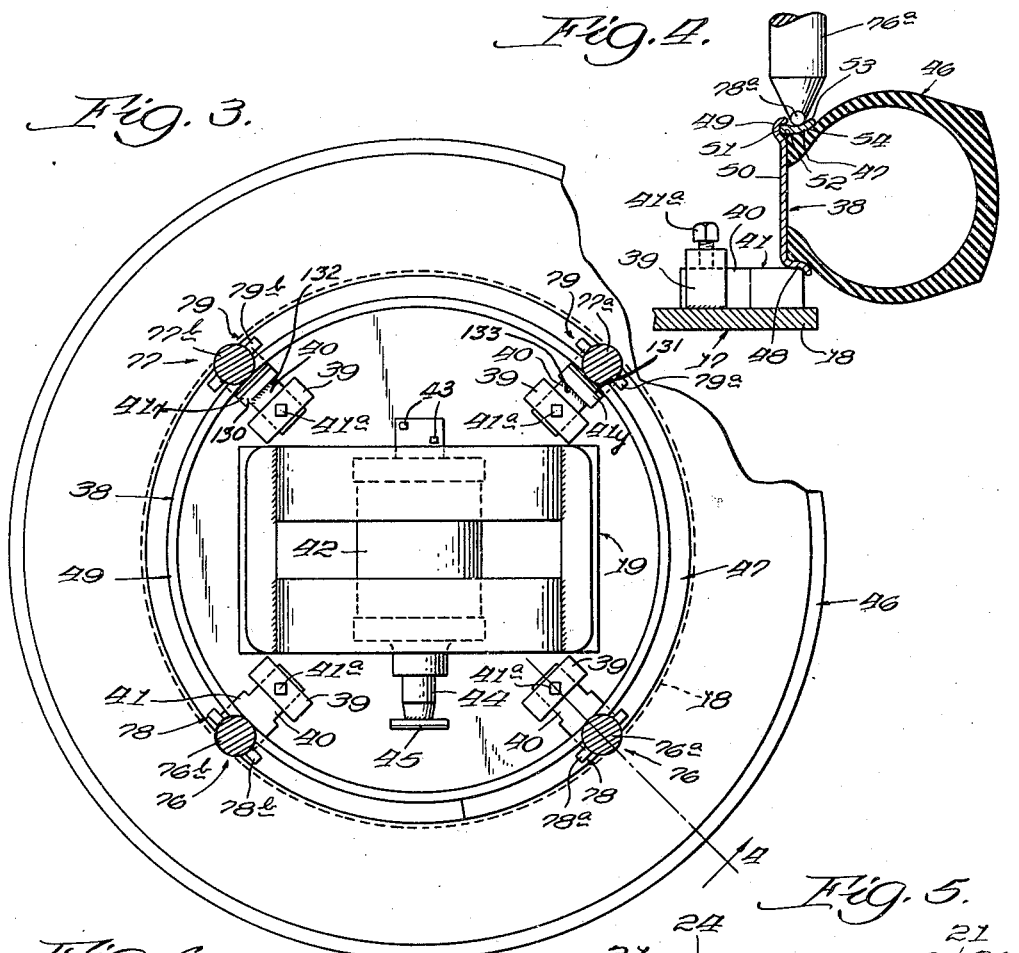
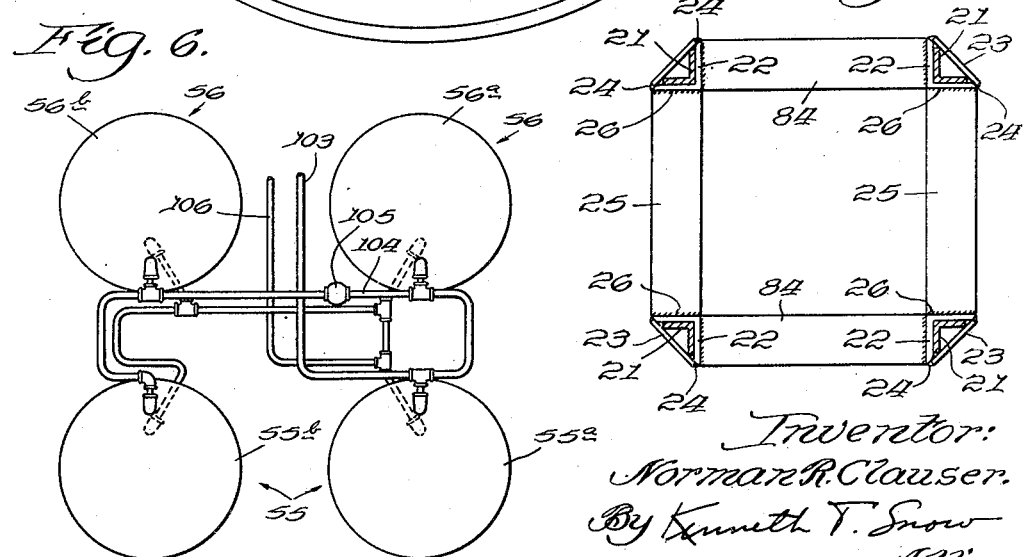

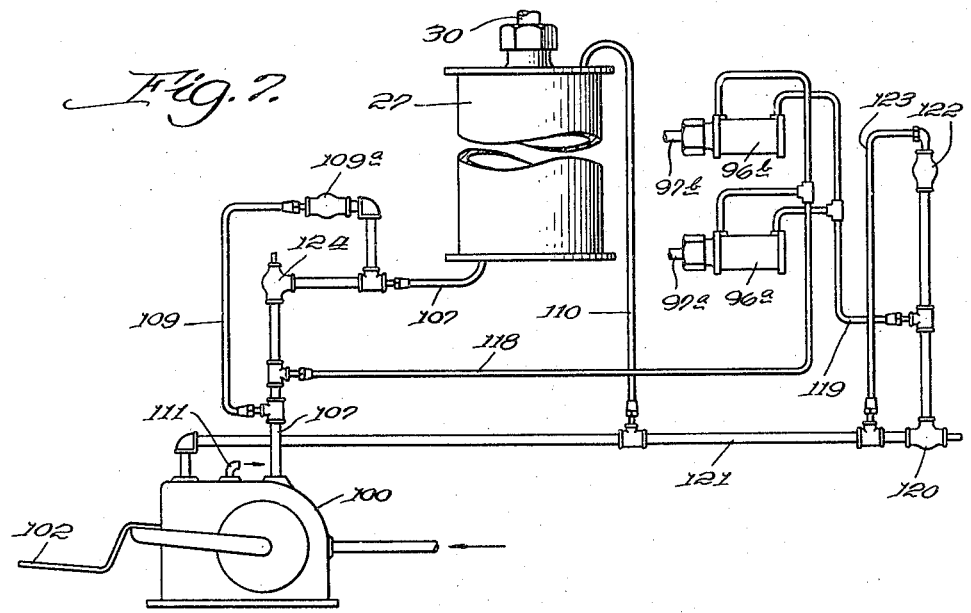

2,488,376

UNITED STATES PATENT OFFICE 2,488,376

FLUID PRESSURE OPERATED TIRE AND RIM ASSEMBLING AND LOCKING RING APPLYING MACHINE

Norman R. Clauser, Fort Wayne, Ind.

Application December 14, 1945, Serial No. 635,061

5 Claims. (Cl. 157—1.1)

This invention relates to a new and improved tire press and has for one of its principal objects the provision of means for assembling a vehicle tire, rim, and locking ring.

The assembly of vehicle tires on rims including the application of locking rings to maintain the tires on the rims is a large and difficult job. The job of assembling tires occurs in factories which manufacture the entire vehicle and further occurs every time a tire on a vehicle is repaired. The device of this invention is especially adapted for assembling large truck tires but may readily be used with smaller passenger car tires.

It is an important object of this invention to provide a device which causes a wheel rim to be fixedly held in position while a tire and locking ring is forced thereover.

An important object of this invention is the provision of means for assembling a vehicle tire and rim whether the rim be split or solid.

Another important object of this invention is the provision of a tire and rim assembly device which is readily applicable to a continuous assembly line for tires and rims.

A further important object is the provision of a tire and rim assembly device which simulates a manual assembly and brings about the locked assembly of rim, tire, and locking ring without distorting the rim or the locking ring.

A still further object of this invention is the provision of a tire press operated by fluid pressure throughout its various cycles.

Another and further important object is to provide a tire press operable by fluid pressure through a plurality of fluid cylinders and pistons which are actuated by manually operable valves.

Other and further important objects will become apparent from the disclosures in the following specification and accompanying drawings in which:

Figure 3 is an enlarged plan view of the rim supporting table with the tire and locking ring being pressed thereon.

Figure 4 is a fragmentary sectional view taken on the line 4 of Figure 3.

Figure 5 is a sectional view taken on the line 5—5 of Figure 2.

Figure 6 is a diagrammatic view of certain of the fluid cylinders of the tire press showing fluid supply and discharge conduits.

Figure 7 is a diagrammatic view showing another part of the fluid operable mechanisms of the tire press of this invention.

Figure 8 is a plan view of the tire press similar to Figure 3 showing a split rim therein.

As shown in the drawings:

Figure 2:
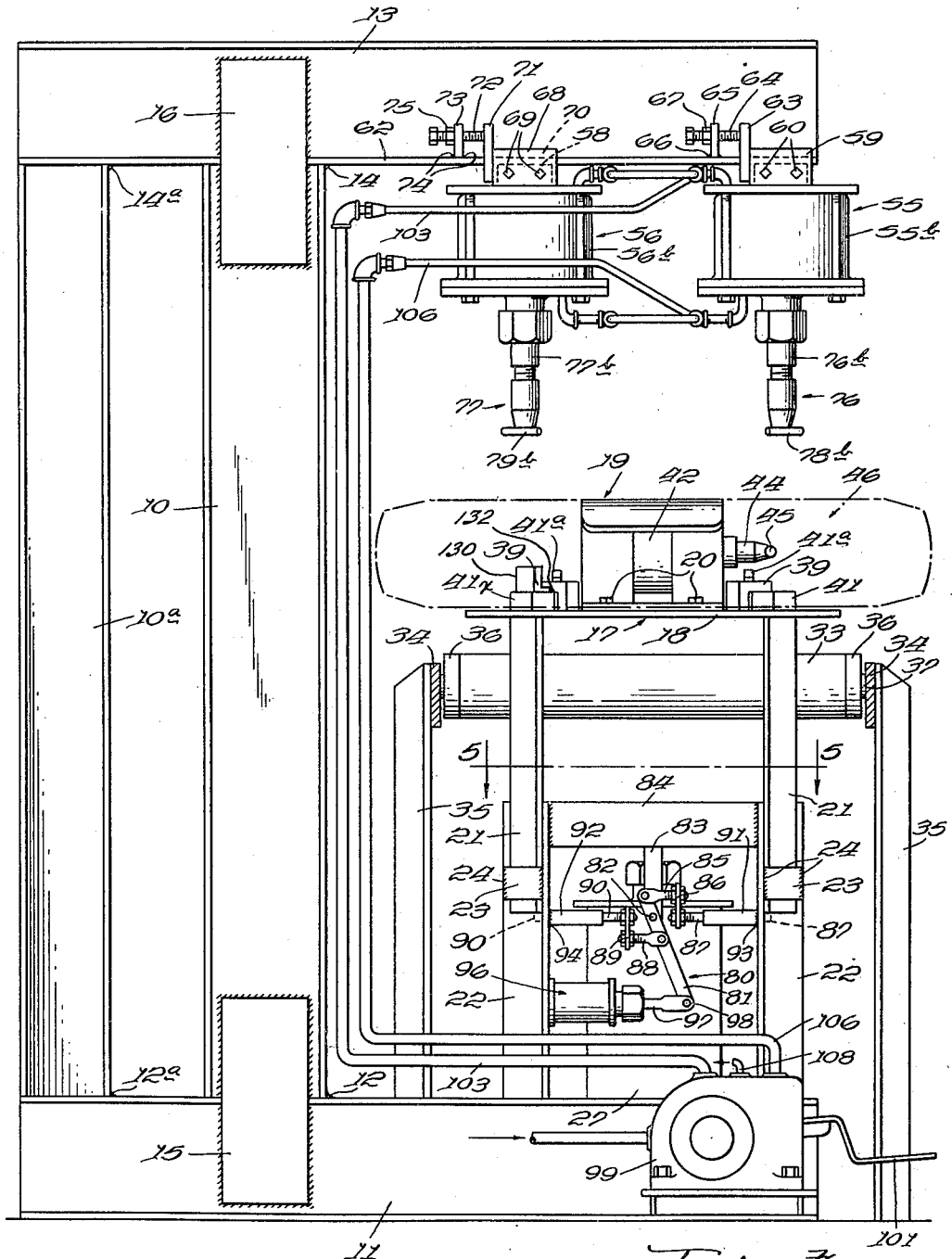
Figure 2 is a side elevation of the device as shown in Figure 1 with the supporting table raised to operating position.

The reference numerals 10 and 10a indicate generally two pairs of vertical frame members which are welded or otherwise fastened at their lower ends on a pair of beams 11 at 12 and 12a respectively. The L-shaped frame formed by the vertical frame members 10 and 10a with the base beams 11 comprises the basic support for the complete tire press of this invention. The upper ends of the vertical beams 10 and 10a support a pair of beams 13 extending in the same direction as the base beams 11. The upper horizontal beams 13 are welded or otherwise fastened to the beams 10 and 10a at 14 and 14a, respectively, as best shown in Figure 2. This entire framework is preferably made of structural steel. However, any material strong enough may be used. The preferred form for each of the structural members 10—10a, 11, and 13 is a steel I-beam. Reenforcing plates 15 and 16 are welded to the members 11 and 10, and 10 and 13, respectively, in order to give strength and rigidity to the basic frame structure.

Figure 1:
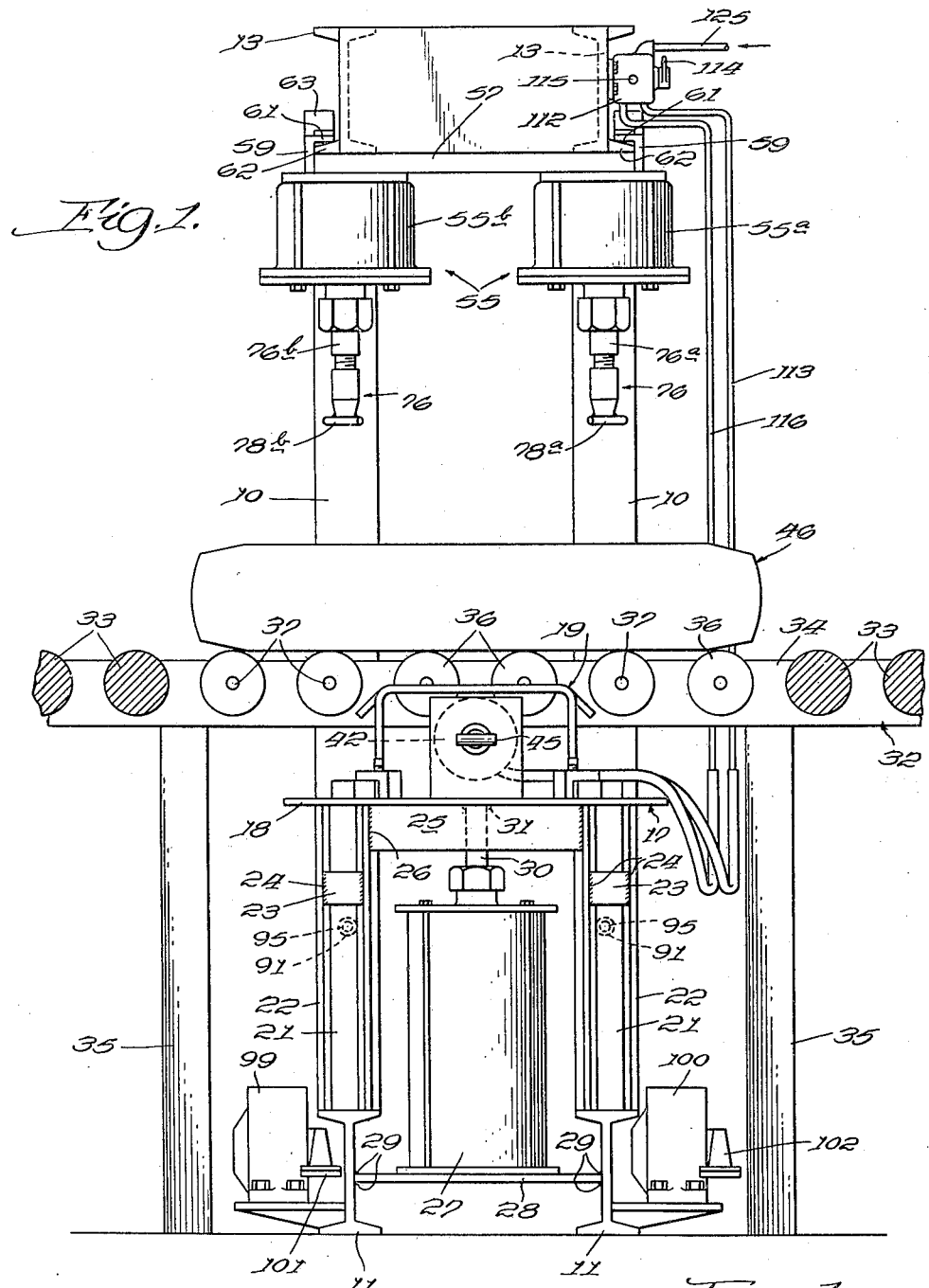
Figure 1 is a front elevational view of the tire press device of this invention shown in its application in a continuous assembly line for tires and rims.

As best shown in Figure 1, the tire press comprises a rim supporting table 17 having a flat circular disc member 18 and a centrally positioned super structure 19 which projects upwardly from the disc 18 and is bolted thereto at 20, as best shown in Figure 2. The disc 18, as shown in Figures 1, 2, and 5, has four downwardly depending legs 21 spaced in the form of a square so that each leg represents a corner of the square. The legs 21 in their preferred form are angle irons and slide vertically within angle frame members 22 rigidly fastened to the supporting beams 11 by welding or other means of attachment. Short strap members 23 are welded to the outer ends of the angle frame members 22 at 24 and positively guide the depending table legs 21 within the frame members 22. Reenforcing frame members 25 are welded between the frame members 22 at 26 and thus tend to stabilize and maintain vertical the angle frame members 22. The rim supporting disc 18 rests on top of the frame members 22 and thus further downward movement of the table member 17 is prohibited.

A cylinder 27 operated by fluid such as air is mounted on a frame member 28 welded to the base beams 11 at 29. The cylinder 27 is positioned centrally beneath the disc 18 and has an upwardly projecting piston 30 adapted to extend upwardly where it is welded to the under side of the disc 18 at 31.

The device as shown forms part of an assembly line and is positioned within a conveyer 32. This conveyer consists of a plurality of transversely disposed spaced rollers 33 mounted between and journaled within side frame members 34. The frame members 34 extending horizontally and transversely of the tire press as shown in Figure 1 of the drawings. The conveyer frame members 34 are supported by leg members 35 spaced intermittently along the length thereof. The supporting table 17 is positioned between the spaced frame members 34, and at this point the wide rollers 33 have been eliminated and replaced with transversely disposed laterally spaced narrow rollers 36 which are pivotally mounted by pins 37 closely adjacent each frame member 34. The spaced narrow rollers form a central space or opening in the roller conveyor. As shown in Figure 1, the table 17 and its super structure 19 are beneath the upper surface of the rollers 33 and 36 when the table is in its lowermost position. Admission of fluid, in this case air under pressure, to the cylinder 27 causes an upward movement of the piston 30 and also the tire press table 17 through the central space between the narrow conveyor 36.

Vehicle wheel rims are moved along the conveyer 32 on the rollers 33 and 36 until the rim 38 is directly above the supporting table 17 at a time when the table is in its lowest position. A subsequent lifting of the table 17 by actuation of the cylinder and piston 27 and 30 causes the rim 38 to encircle the super structure 19. As best shown in Figure 3 the disc 18 is provided with upwardly extending lugs or ears 39 which are welded or otherwise fastened to the surface of the disc 18 at 90° intervals about the disc. These lugs 39 are adapted to receive shank portions 40 of rim supporting blocks 41. The rim blocks 41 extend radially outwardly a distance slightly greater than the inner diameter of the wheel rim 38 and are adjustably locked in fixed position by set screws 41a. Inasmuch as the tire press of this invention is adapted to operate in conjunction with many sizes of tires and rims, it is necessary to be able to readily extend or retract the rim blocks 41 in order to accommodate the various sizes of rims. When it is desired to assemble a tire on a smaller rim, the set screws 41a are loosened, the blocks and their shanks are moved radially inwardly within the sleeves 39 and the set screw retightened at the desired position. One reason for having the rim 38 set on the blocks 41 is to permit the tire which is ordinarily of greater width than the rim to drop completely onto the rim and not be held up from complete engagement with the rim flange 48 because the side wall of the tire would strike some obstacle such as the table disc 18 if the rim were permitted to rest directly on the disc 18.

A cylinder 42 is positioned horizontally within the super structure 19 and is bolted to the disc member 18 at 43. The cylinder 42 is equipped with a piston 44 having a cross head 45. The blocks 41 opposite the piston cross head 45 are additionally identified by letters X and Y. Each of the blocks 41X and 41Y is equipped with abutment or stop members 130 and 131 welded respectively at 132 and 133 to the tops thereof as shown in Figure 3. The piston and cross head 44 and 45 may be extended or withdrawn upon the admission or withdrawal respectively of fluid under pressure to the cylinder 42. When the piston 44 is extended the cross head 45 engages the inner surface of the rim 38. By pushing against the stop members 130 and 131 the rim is maintained in rigid relationship with respect to the supporting table 17. The rim 38 as shown in Figure 3 is a solid rim, but a split rim 38a may be used as shown in Figure 8. In such case the rim 38a is spread by extension of the piston 44.

The diameter of the disc 18, as shown in Figure 2, is sufficiently small so that it may be extended upwardly between the short rollers 36 of the conveyer 32. After the rim is firmly held on the rim blocks 41 by the piston cross head 45, a tire 46 of corresponding size is placed over the rim 38 and a split locking ring 47 is placed on the tire and substantially centered with respect to the tire and the rim. The rim 38, as best shown in section in Figure 4, is of such a shape that the lower annular edge 48 extends sufficiently inwardly to prevent the tire 46 from passing thereneath. The upper edge 49 does not overhang, and hence the tire 46 may be put on from the top and dropped over the flat body portion 50 without hindrance. The upper edge 49 is provided with an annular groove 51 which is adapted to receive one annular edge 52 of the split locking ring 47. The curved portion 53 of the split ring 47 rests in an annular depression 54 in the upper side wall of the tire 46 closely adjacent the inner circumference of the tire.

The pair of upper beam members 13 as shown in Figures 1 and 2 form the support for two pairs of cylinders 55 and 56. The pair of cylinders 55 including individual cylinders 55a and 55b are joined by a cross member 57, and likewise the pair of cylinders 56 including individual cylinders 56a and 56b are joined by a similar cross member 58. The top sides of the cylinders are fixedly attached to the cross members 57 and 58. Angle brackets 59 are bolted to the cross member 57 at 60 as shown in Figure 2. The angle members 59 are equipped with inwardly turned flanges 61 which hang on the lower outside lips 62 of the I-beams 13 and which may be slidably adjusted therealong. The angle members 59 have welded at one end thereof an upwardly extending ear 63 which, as best shown in Figure 2, has a threaded bolt stub 64 fixed to one side thereof. A lug 65 is welded to the lower lip 62 of the I-beams 13 at 66. With the aid of nuts 67 engaging the threaded bolt stud 64 on the opposite side of the fixed lug 65, the cylinders 55 may be slidably moved along the I-beam ledge 62 to and from the fixed lug 65. The cross member 58 carrying the cylinders 56 is equipped with similar elements to enable it to be slidably adjusted along the lower lip 62 of the I-beams 13. Angle members 68 are bolted to the ends of the cross member 58 at 69 and are equipped with inwardly turned flanges 70 which ride along the ledge 62 of the I-beam. Ears 71 are welded to one end of the angle member 68 and have bolt studs 72 fixedly attached thereto and extending in a horizontal direction. Lugs 73 corresponding to lugs 65 are welded to the ledge 62 of the I-beams 13 at 74. The bolt studs 72 are adapted to pass through an aperture in the lugs 73 sufficiently large to permit ready passage of the stud 72 but small enough to prevent passage of adjusting nuts 75. The cylinders 56 are therefore movable as a pair to and from the fixed lugs 73 depending upon movement of the lock nuts 75 along the threaded bolt stud 72.

The pairs of cylinders 55 and 56 are equipped with downwardly projecting extensible pairs of pistons 76 and 77 respectively. The pair of pistons 76 includes individual pistons 76ª and 76ᵇ whereas the pair of pistons 77 includes individual pistons 77ª and 77ᵇ. The lower ends of the pairs of pistons 76 and 77 have welded thereto cross- or T-heads 78 and 79, respectively, designated individually as 78ª and 78ᵇ and 79ª and 79ᵇ. These cylinders 55 and 56 are actuated by a fluid under pressure such as air in the same manner that the cylinders 27 and 42 were operated. However, all four cylinders 55 and 56 are not operated in unison but rather are operated singly in rotation. As best shown in Figure 4, the T-head 78ª of the piston 76ª engages the curved portion 53 of the split locking ring 47 upon extension of the piston 76ª downwardly from the cylinder 55ª. The piston 76ª projects downwardly sufficiently to cause the annular edge 52 of the split locking ring 47 to engage the annular groove. The split locking ring 47 is made of a spring steel so that it normally has a diameter less than the inner diameter of the rim 38, and hence when the T-heads 78 and 79 of the cylinders 55 and 56 push downwardly on the locking ring 47 within the rim 38, the ring automatically springs inwardly when it reaches the annular notch 51 thereby preventing withdrawal of the locking ring and thus also preventing withdrawal of the tire 46. Action by all four T-heads 78 and 79 concurrently would cause the spring steel split locking ring 47 to take a new setting because of its total distortion all at one time. In other words, if the locking ring 47 were pushed inwardly from all sides simultaneously, it would lose the spring that is used to cause it to lock within the annular rim notch 51. Therefore, the cylinders 55 and 56 are operated separately and successively in rotational order about the periphery of the split ring to be applied to the rim 38. The distortion of merely a portion of the split ring 47 does not cause it to take a new set. Further the application of a downward force to the T-heads 78ª, 79ª, 79ᵇ, and then 78ᵇ, in that order, simulates hand assembly of the split locking ring on the rim 38.

As shown in Figure 2, a positive locking mechanism is provided for the table 17 when it reaches its uppermost position. This locking mechanism is indicated by the numeral 80. An arm 81 is pivoted at 82 on a frame member 83 fixedly attached to a side tie member 84 extending between the legs 22 in the same manner as the tie members 25. The frame member 83 is thus a part of the fixed frame structure of the tire press of this invention. One end of the arm 81 has pivoted thereto an arm 85 which is attached to a tie member 86 adapted to cause outward movement of one locking pin 87. On the other side of the pivot 82 is an arm 88 pivoted to the arm 81 in the same manner as the arm 85 but extending in the opposite direction. Again a tie member 89 similar to the tie member 86 causes a locking pin 90 to be moved into and out of locking position. The locking pins 87 and 90 project within sleeves 91 and 92 which are welded at 93 and 94 respectively to the legs 22. As shown in Figure 1, the legs 22 are provided with holes 95 to permit passage of the locking pins 87 and 90 when they are moved to a fully extended position through the sleeves 91 and 92. A pair of cylinders 96 including individual cylinders 96ª and 96ᵇ are fixedly mounted to the leg members 22 and have pistons 97 projecting outwardly therefrom to engage an extension of the arm 81 at 98. When fluid under pressure is admitted to the cylinder 96, the piston 97 is withdrawn into the cylinder thus causing the locking arms to be extended outwardly through the apertures 95 in the legs 22. The admission of fluid under pressure to this cylinder 96 occurs after the supporting table 17 has been raised by the extension of the piston 30 from the cylinder 27, at which time the depending legs 21 of the supporting table 17 are raised to a position just above the apertures 95 in the legs 22, as best shown in Figure 2, thus permitting the locking pins 87 and 90 to project into the space formerly occupied by the supporting table legs 21. In this manner the split locking ring may be forced onto the rim 38 when the supporting table 17 is in a substantially rigid position. The cylinders 55 and 56 are therefore not acting against the cylinder 27, but rather the locking pins 87 and 90 hold the work table 17 in its upper or tire pressing position.

Fluid under pressure is piped to a pair of valves 99 and 100 located at the base of the tire press and on each side thereof. Each of these valves 99 and 100 has a foot pedal operating lever 101 and 102 respectively. The valve 99 is adapted to direct fluid under pressure to the pairs of cylinders 55 and 56. As shown in Figure 2, a conduit 103 joins the valve 99 with the upper ends of the cylinders 55 and 56. As best shown in Figure 6, the fluid passing up through the conduit 103 is piped in series to the four cylinders 55ª, 56ª, 56ᵇ, and then 55ᵇ in that order so that the pistons projecting downwardly from each of these cylinders will be extended in that rotational order. The mere fact that the cylinders are piped in series is not of itself sufficient to cause the pistons to fully actuate in successive rotational order. However, there is a slight tendency for the one receiving the fluid first to operate slightly prior to the cylinders successively receiving the fluid under pressure. It will be noted that between cylinders 56ª and 56ᵇ a conduit 104 carrying the fluid under pressure to the tops of these cylinders has a restriction 105 which considerably retards the passage of fluid under pressure to the cylinder 56ᵇ and thus also the cylinder 55ᵇ. The cylinders 55ª and 56ª have their pistons 76ª and 77ª extended almost simultaneously with the piston 76ª coming down slightly prior to the cylinder 77ª. However, the cylinders 56ᵇ and 55ᵇ are actuated after a time lapse between the operation of the cylinders 55ª and 56ª, and they operate in the order of their connection in the series line in the same manner as the cylinders 55ª and 56ª with the cylinder 56ᵇ operating slightly in advance of the cylinder 55ᵇ. The conduits are sufficiently flexible to permit adjustment of the cylinders 55 and 56 for accommodating various sizes of tires.

Depression of the valve pedal 101 causes the valve 99 to direct fluid through the conduit 103 to the top of the pairs of cylinders 55 and 56. A releasing or permitting of the pedal 101 to raise causes fluid under pressure to be directed through a conduit 106 to the lower end of the pairs of cylinders 55 and 56. The conduit 106 carries fluid under pressure to the cylinders 55 and 56 in series and in the same rotational order in which the fluid is fed to the tops of these cylinders. In other words, fluid is admitted to the bottom of cylinders 55ᵃ first and cylinder 56ᵃ second, thence to the cylinder 56ᵇ and then cylinder 55ᵇ. An exhaust outlet 108 forms part of the valve 99 and permits fluid within the cylinders 55 and 56 to be exhausted therethrough. When the pedal 101 is pushed downwardly, the pistons for the cylinders 55 and 56 are extended downwardly thus forcing fluid within these cylinders out through the conduit 106 back through the valve 99 and out through the discharge port 108. Conversely, when the pedal 101 is raised, the cylinder pistons are raised in rotational order and the fluid from the several cylinders is discharged from the tops of the cylinders 55 and 56 through the conduit 103 back through the valve 99 and through the exhaust port 108. Extending the pistons 76 and 77 in the order indicated is conducive to effective tire and rim assembly.

The valve 100, as best shown in Figures 1 and 7, having the foot operated pedal 102 directs fluid under pressure to the cylinder 27. Conduits 107 and 109 join the valve 100 with the lower portion of the cylinder 27, and a depression of the pedal 102 causes fluid under pressure to be forced through the conduit 107 around the by-passing conduit 109 and through the swing check valve 109ᵃ back to the conduit 107 to the cylinder 27 thus causing the piston 30 with the table 17 to rise. Simultaneously the fluid under pressure is carried through a conduit 118 to the forward ends of the cylinders 96ᵃ and 96ᵇ. However, the pistons 97ᵃ and 97ᵇ are not actuated until such time as the table piston 30 has reached its uppermost position, because exhaust conduit 119 for the cylinders 96ᵃ and 96ᵇ is provided with a pressure relief valve 120 through which the fluid must pass to return through a conduit 121 to the valve 100 and out the exhaust port 111. A ball check-valve 122 prevents by-passing of exhausted fluid upwardly through a conduit 123 for return to the conduit 121. The relief valve 120 is adjusted to open when the table 17 has reached its upper or tire assembly position. The retraction of the pistons 97ᵃ and 97ᵇ within the cylinders 96ᵃ and 96ᵇ, respectively, causes an extension of the locking pins 87 and 90 and a fixed locking of the table in an up position. A release of valve pedal 102 causes fluid under pressure to be applied to conduit 121 where it immediately travels up conduit 123 and down through the check-valve 122 to the rear ends of the cylinders 96ᵃ and 96ᵇ and to the top side of table cylinder 27 through a conduit 110. Fluid is exhausted from the forward ends of the cylinders 96ᵃ and 96ᵇ through the conduit 118 back to the valve 100 where it is discharged through the port 111. As a result the locking pins 87 and 90 are withdrawn from table leg locking position at which time the table 17 may be lowered. In order that the table will not be forced downwardly during the time of removal of the locking pins another pressure relief valve 124 is provided in the conduit 107. Fluid within the cylinder 27 exhausts through the downwardly extending conduit 107 by reason of fluid being applied to the top of the cylinder thus causing a lowering of the table 17. The fluid is prevented from by-passing the relief valve 124 by the check-valve 109ᵃ. As in the case of the relief valve 120 the valve 124 is adjusted to open after the cylinders 96ᵃ and 96ᵇ have been fully actuated.

A hand-operated valve 112 is positioned at the top of the tire press device and is fixed to the I-beam 13 as shown in Figure 1. This valve 112 is supplied with fluid under pressure in the same manner as the valves 99 and 100 through a conduit 125 and is adapted to operate the rim holding and spreading cylinder 42. A conduit 113 leads from the valve 112 to the rear end of the cylinder 42, and upon pulling down the valve operating handle 114, fluid under pressure is passed through the conduit 113 to the cylinder 42 whereupon the piston and T-head 45 are extended causing firm gripping of a solid rim and spreading of a split rim, such as will be explained hereinafter. The valve 112 is supplied with an exhaust port 115 and an additional conduit 116 which leads to the forward end of the cylinder 42. Each of the cylinders employed in this device is double acting—that is, each is power extended in both directions.

Often times it is desired to use a split rim instead of a solid rim such as has been shown in Figures 3 and 4 of the drawing. A split rim 38ᵃ is shown in Figure 8 and is positioned on the blocks 41 on the table 17. The hand-operated valve 112 is actuated and the T-headed piston 45 of the cylinder 42 is extended thus forcing the split rim outwardly to its full circumference so that the ends 126 and 127 thereof meet without overlapping. In assembling a tire 128 and a solid locking ring 129 on a split rim, the tire and ring are dropped over the split rim 38ᵃ prior to the rim being spread outwardly. The cylinder 42 is then actuated by the hand valve 112 thus spreading the rim and causing the tire and solid ring to be locked in position on the rim. Use of the pairs of cylinders 55 and 56 is optional when assembling a split rim unit 38ᵃ. If used the T-headed pistons 78 assist in holding the solid ring in a downward tire-engaging position during spreading of the split rim 38ᵃ. Similarly in assembling a solid rim unit the use of the cylinder 42 is optional inasmuch as the rim need not be spread but rather only held securely. It is desirable to employ the cylinder 42 to hold the solid rim in stationary position during tire press operation.

In the operation of this tire press the rims are moved along the conveyer 32 on the rollers 33 until they reach a position over the rollers 36 directly above the supporting table 17. The tire 46 is then placed over the rim 38 and a split locking ring is placed in the upper annular depression 54 of the tire 46, whereupon the attendant depresses the foot pedal 102 of the valve 100 which immediately causes the piston 30 of the cylinder 27 to be raised carrying with it the supporting table 17. As previously described in conjunction with Figure 3, the rim flange 48 encircles the blocks 41 and the rim is immediately held in fixed position by an extension of the piston 44 of the cylinder 42. The pair of cylinders 55 and 56 then become actuated individually in successive rotation about the tire as shown in Figure 3 by depression of the valve pedal 101 of the valve 100. The T-heads come down by admission of fluid under pressure to their respective cylinders 55 and cause the annular flange 52 of the split locking ring 47 to be deposited in the annular groove 51 in the rim 38 in small increments until the entire ring is locked within the rim. Previous to the actuation of the cylinders 55 and 56 the cylinders 96 are actuated just as soon as the piston 30 of the cylinder 27 has been fully extended, thus positively causing locking of the supporting table 17 in its raised operative position. Upon the completion of the tire press operation, the attendant first releases his foot from the valve pedal 101 at which time the fluid under pressure is withdrawn from the cylinders 55 and 56 and secondly releases his other foot from the valve pedal 102 causing an unlocking of the mechanism 80 by reverse movement of the pistons 97 of the cylinders 96. The supporting table 17 is then dropped downwardly whereupon the rim is released by actuation of the valve hand lever 114 causing a withdrawal of the cross-head 45 into the cylinder 42 leaving the assembled rim tire and locking ring on the conveyer 32 where it may be moved along on the rollers 33 and 36.

I am aware that numerous details of construction may be varied throughout a wide range without departing from the principles disclosed herein, and I therefore do not propose limiting the patent granted hereon otherwise than as necessitated by the appended claims.

What is claimed is:

1. In a tire press comprising a supporting framework, a vertically movable table associated with said supporting framework, said table adapted to receive an unassembled rim, tire, and locking ring, downwardly movable members positioned above said table and associated with said supporting framework adapted to press said locking ring, tire, and rim into assembled relationship, fluid cylinder means for moving said table upwardly, fluid cylinder means for moving said members above said table, fluid cylinder means fixed to said supporting framework for effecting locking of the table in a raised position including locking pins movable outwardly by said fluid cylinder means to a supporting position beneath the table, and valve and conduit means arranged to successively raise said table and to extend said locking pins and to successively retract said locking pins and lower said table.

2. In a tire press for assembling a rim, tire and locking ring, comprising a frame structure, a table at a height level adapted to receive a vehicle rim from a conveyor, means for locking said rim in rigid position on said table, said table having depending legs adjacent fixed legs of the frame structure, a fluid operated cylinder and piston adapted to raise said table above the height of the conveyor and cause said table legs to slide with respect to said frame structure legs, locking pins supported on said frame structure and having a fluid operated cylinder for causing their outward extension to a position beneath the depending table legs when the table and legs are in their uppermost position, and means for assembling said rim, tire, and locking ring when the table is so locked in raised position.

3. In a tire and rim mounting apparatus including a conveyor having a fixed frame, a plurality of transversely disposed wide rollers journally carried in said fixed frame, said rollers being of a width to carry a vehicle rim, and a plurality of transversely disposed laterally spaced narrow rollers in alignment with the wide rollers for a continuation thereof, said spaced narrow rollers forming a central space therebetween, a vertically movable mounting table normally disposed beneath said conveyor at the point of the central space, means moving said table upwardly through the central space of said conveyor, said mounting table adapted to support a rim received from said conveyor for the purpose of mounting a tire thereon.

4. An apparatus as set forth in claim 3 in which means are provided for locking the table in its upwardly moved position, and means above said table for forcing said tire and a locking ring onto said rim to effect an interlock of the tire and rim.

5. In a tire and rim mounting apparatus including a conveyor for removing mounted tires and rims, said conveyor having a fixed frame, a plurality of transversely disposed wide rollers journally carried in said fixed frame, said rollers being of a width to carry a vehicle tire and rim, and a plurality of transversely disposed laterally spaced narrow rollers in alignment with and preceding the wide rollers, said spaced narrow rollers forming a central space therebetween, a vertically movable mounting table normally disposed beneath said conveyor at the point of the central space, means moving said table upwardly through the central space of said conveyor, said mounting table adapted to support the vehicle rim for the purpose of mounting a tire thereon, and means lowering said mounting table beneath the conveyor whereby the mounted tire and rim are transported away on said conveyor.

NORMAN R. CLAUSER.

REFERENCES CITED

The following references are of record in the file of this patent:

UNITED STATES PATENTS

| Number | Name | Date |
|---|---|---|
| 1,352,722 | Caldwell | Sept. 14, 1920 |
| 1,402,471 | Beck | Jan. 3, 1922 |
| 1,667,351 | Levitt | Apr. 24, 1928 |
| 1,850,053 | Stevens | Mar. 15, 1932 |
| 1,994,974 | Wiedmann | Mar. 19, 1935 |
| 2,034,819 | Maulis | Mar. 24, 1936 |
| 2,345,346 | Larson | Mar. 28, 1944 |
| 2,353,187 | Rerick et al. | July 11, 1944 |
| 2,375,956 | Smith et al. | May 15, 1945 |
| 2,213,535 | Seip | Sept. 3, 1945 |